(No Model.)
J. H. BALLMAN.
PHOTOGRAPHIC PLATE HOLDER.
No. 474,571. Patented May 10, 1892.
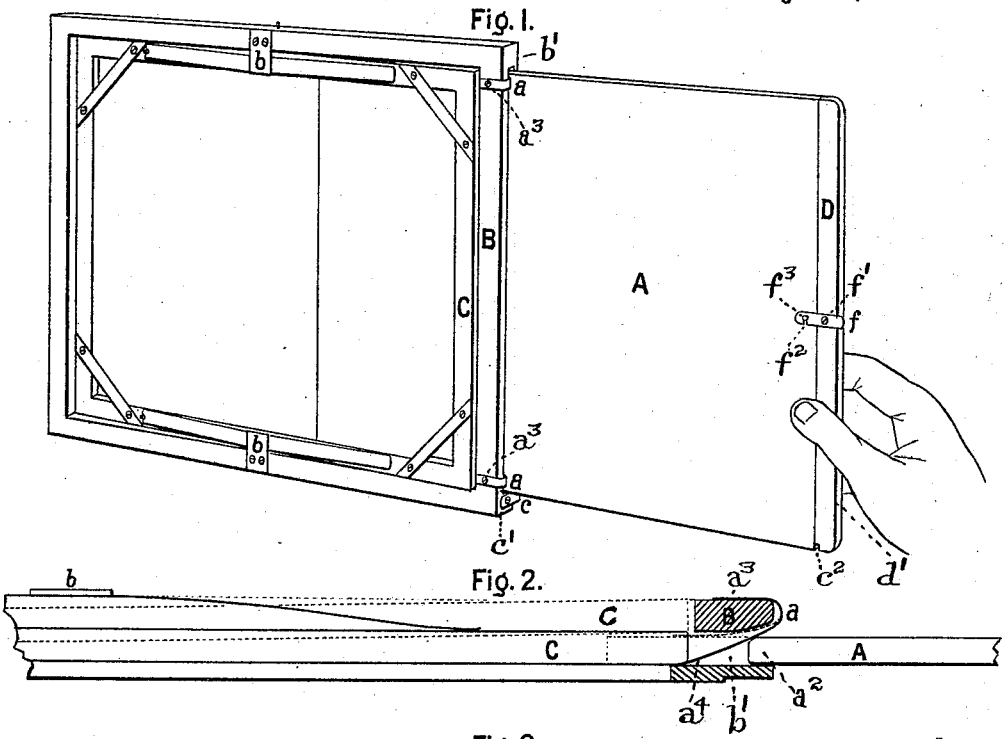
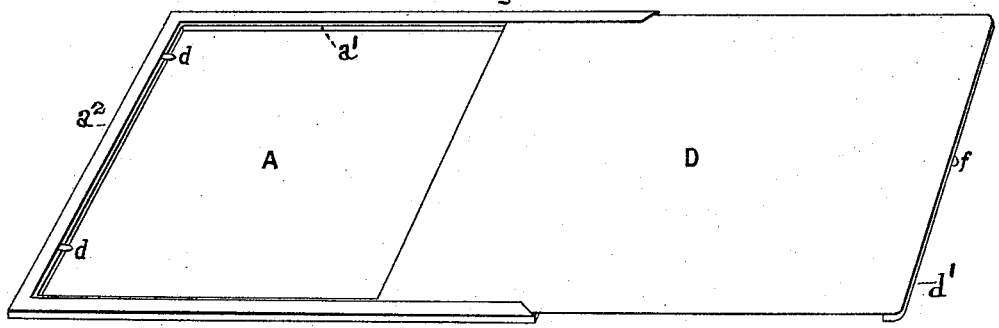
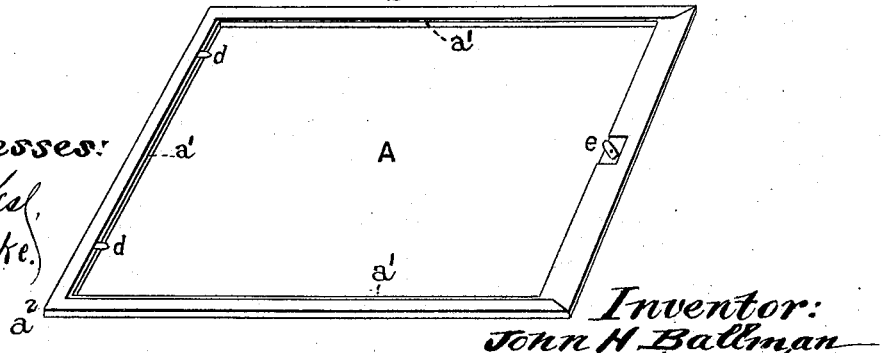
Witnesses:
W. J. Keal,
J. W. Hoke.
Inventor:
John H. Ballman
by C. D. Moody atty

UNITED STATES PATENT OFFICE.

JOHN H. BALLMAN, OF ST. LOUIS, MISSOURI.

PHOTOGRAPHIC-PLATE HOLDER.

SPECIFICATION forming part of Letters Patent No. 474,571, dated May 10, 1892.

Application filed May 22, 1891. Serial No. 393,734. (No model.)

*To all whom it may concern:*

Be it known that I, JOHN H. BALLMAN, of St. Louis, Missouri, have made a new and useful Improvement in Photographic-Plate Holders, of which the following is a full, clear, and exact description.

The leading object of my improvement is to simplify and facilitate the manipulation of that part of a photographic camera which is styled a "dry-plate holder;" and the improvement consists in the means substantially as is hereinafter set forth and claimed, aided by the annexed drawings, making part of this specification, in which—

Figure 1 is a view in perspective, from the rear side thereof, of the plate-holder and the frame which supports it in the camera. The holder is shown inserted part way in the frame, and the ground glass, which is held in the same frame, is accordingly displaced from the position which it occupies in said frame during the operation of focusing; Fig. 2, a bottom edge sectional elevation, upon an enlarged scale, of a portion of the construction shown in Fig. 1; Fig. 3 a view in perspective, from the front side thereof, of the plate-holder, the slide being partly drawn out; and Fig. 4, a view in perspective, from the front side thereof, of the plate-holder, the slide being removed. The dry-plate is not shown in any of the views.

The same letters of reference denote the same parts.

A represents the plate-holder. D represents the slide for covering and uncovering the dry-plate while in the holder. It is adapted to work in the groove $a'$ of the holder. To fasten it in the holder, the slide is provided with a catch $f$, pivoted at $f'$ and notched at $f^2$, and which when turned into the position shown in Fig. 1 engages with a pin $f^3$ upon the holder, and thereby serves to secure the slide, so that when it is grasped at its outer end $d'$ to withdraw it from the frame B the plate-holder is withdrawn with it. The dry-plate (not shown) is adapted to be suitably held within the plate-holder by means of the pins $d\ d$ and the catch $e$, with which the plate-holder is provided, substantially as shown. Said pins and catch are within the plane of the groove $a'$, in which the slide D works.

The plate-holder is adapted to be secured within the frame B—say by means of the catch $c$, which is pivoted to said frame B—and adapted to be turned around thereon to cause its ends $c'$ to come at $c^2$ between the outer end of the holder and the slide end $d'$ whenever it is desired to uncover the dry-plate. To release the plate-holder, the catch $c$ is turned into the position shown in Fig. 1.

B represents the frame which supports the described plate-holder and also the ground glass C within the camera. The prominent feature of the present construction is, as stated, the provision whereby the plate-holder can be readily inserted in place in the camera. When the plate-holder is withdrawn from the frame B, the ground glass C is—say by means of the springs $b\ b$—pressed forward in the frame B into the proper position therein for the operation of focusing. In Fig. 1 the left-hand portion of the ground glass is represented thus pressed forward. The plate-holder of course when the picture is to be taken must be so placed within the frame B as to enable the dry-plate to occupy the position of the ground glass. This is accomplished as follows: At that end $b'$ of the frame B at which the plate-holder is introduced into the frame the construction is such that the plate-holder on introducing it is enabled to act as a wedge between the front side of the ground glass and that portion of the frame B which is in front of the ground glass, and thereby to force the ground glass backward from its focusing position sufficiently to admit the plate-holder in front of it—that is, by means of a single hand E the operator is enabled to insert the plate-holder in position in the camera and at the same time displace the ground glass. To this end the ground glass at that end thereof which is toward the end $b'$ of the frame B and the inner end $a'$ of the plate-holder, together with any auxiliary part or parts employed and adapted to coact with the ground glass and plate-holder for the purpose under consideration, are so relatively contrived as to enable the plate-holder to act as a wedge in displacing the ground glass from its focusing position. What I consider the most desirable means to this end are as follows: The ends of the ground glass and the plate-holder, respectively, are made substantially square, as shown in Fig. 2, and to enable the entering end $a^2$ of the plate-holder to get in front of the ground glass, as described, I arrange spring-guides $a\ a$—as many as may be needed and of suitable shape—which are attached to the frame B, substantially as shown at $a^3$, and extending thence from the rearward side of the frame B inward into an opening therein, through which the plate-holder is inserted, and so as to extend them at the free end $a^4$ thereof inward and in front of the ground glass sufficiently to enable said guides when acted upon by the plate-holder to act as levers to force the ground glass backward, as described. The parts $a\ a$ thus serve as guides to direct the course of the plate-holder as it is being introduced into the frame B and also as a means for prying the ground glass out of the way of the plate-holder.

The operation is illustrated in Fig. 1, in which view the plate-holder is shown introduced part way into the frame B, the near end of the ground glass being pressed backward in the frame B in the rear of the end $a^2$ of the plate-holder and the opposite end of the ground glass still in its focusing position. As the plate-holder is thus introduced the near ends of the springs $b\ b$ yield sufficiently to enable that end of the ground glass to be moved backward, and ultimately the springs throughout their length similarly yield, so that the plate-holder can be properly introduced into the position previously occupied by the ground glass. The two positions of the ground glass are indicated in the full and in the broken lines, respectively, in Fig. 2. When the plate-holder is withdrawn from the frame B, the springs $b\ b$ act to replace the ground glass in its focusing position. The ground glass, saving as its construction may be modified by the present improvement, is constructed in the ordinary manner. The frame B, saving as its construction is modified or supplemented by the improvement under consideration, is any suitable attachment to or part of an ordinary photographic camera.

I claim—

The combination of the ground glass, the plate-holder, and the frame for containing said ground glass and plate-holder, said frame being provided with the spring-guides $a\ a$, substantially as described.

Witness my hand this 14th day of May, 1891.

JOHN H. BALLMAN.

Witnesses:
C. D. MOODY,
L. W. BUCHANAN.